July 28, 1970  C. D. BRANSON ET AL  3,521,814
FUEL CONTROL SYSTEM AND PARTS THEREFOR OR THE LIKE
Filed Oct. 5, 1967  5 Sheets-Sheet 1

INVENTORS
CHARLES D. BRANSON
DENIS G. WOLFE
BY

THEIR ATTORNEYS

United States Patent Office 3,521,814
Patented July 28, 1970

3,521,814
FUEL CONTROL SYSTEM AND PARTS
THEREFOR OR THE LIKE
Charles D. Branson, Greensburg, and Denis G. Wolfe,
Southwest Greensburg, Pa., assignors to Robertshaw
Controls Company, Richmond, Va., a corporation of
Delaware
Filed Oct. 3, 1967, Ser. No. 672,520
Int. Cl. F23n; G05d 23/12
U.S. Cl. 236—15                                    20 Claims

ABSTRACT OF THE DISCLOSURE

This disclosure relates to a fuel control system for a domestic oven or the like wherein an electric thermostat is provided for operating a gas regulating means to control the temperature effect in the oven as selected by a manual selector means, the manual selector means also simultaneously controlling a valve member for interconnecting and disconnecting the fuel supply to the electrically operated regulating means. The fuel control system also has means for automatically reducing the temperature effect in the oven to a low temperature effect after the occurrence of an event, such as the lapse of a predetermined cooking time, and permits the housewife or the like to select a temperature effect below the automatic low temperature effect, even though the timer means or the like has automatically adjusted the control system to its low temperature effect setting.

---

This invention relates to an improved fuel control system for fuel burning apparatus or the like as well as to improved parts for such a fuel control system or the like.

One of the features of this invention is to provide a control device wherein an electric thermostat is utilized to control an electrically operated gas regulating means to tend to maintain a temperature effect of a burner means at a pre-selected temperature effect selected by manually operated selector means, the selector means also controlling a valve member for interconnecting and disconnecting a source of fuel to the electrically operated regulating means for an on-off operation thereof.

In particular, the electric thermostat of this invention controls the fuel gas supply to the burner means by means of an electrically operated heat motor valve or solenoid valve or the like, while the valve member controls the fuel gas supply to the burner means upstream of the electrically operated valve.

Such control device can be directly mounted on a fuel supply manifold or be connected at a point remote from such manifold as desired, as will be apparent hereinafter.

Another feature of this invention is to permit the control device to be automatically modified to a lower holding temperature effect by the remote opening of a switch controlled by a clock or timer or the like wherein the housewife or the like can initially set the control device to maintain a relatively high cooking temperature in the oven for a pre-selected length of time, whereby after the lapse of such time, the control device will automatically reduce the temperature in the oven to a lower warmth-retaining and non-cooking temperature to be maintained in the oven till the housewife or the like terminates the operation of the oven.

In addition, the housewife or the like can manually change the temperature setting of the control device to a temperature lower than the previously described holding temperature, even while the remote clock or timer-operated switch remains open.

Accordingly, it is an object of this invention to provide an improved control system having one or more of the novel features set forth above or hereinafter shown or described.

Another object of this invention is to provide improved parts for such a control system or the like.

Other objects, uses and advantages of this invention are apparent from a reading of this description, which proceeds with reference to the accompanying drawings forming a part thereof and wherein:

While the various features of this invention are hereinafter described and illustrated as being particularly adaptable for providing a fuel control system for a domestic oven or the like, it is to be understood that the various features of this invention can be utilized singly or in any combination thereof to provide a control means for other types of apparatus as desired.

Therefore, this invention is not to be limited to only the embodiments illustrated in the drawings, because the drawings are merely utilized to illustrate one of the wide variety of uses of this invention.

Figures 1, 2:
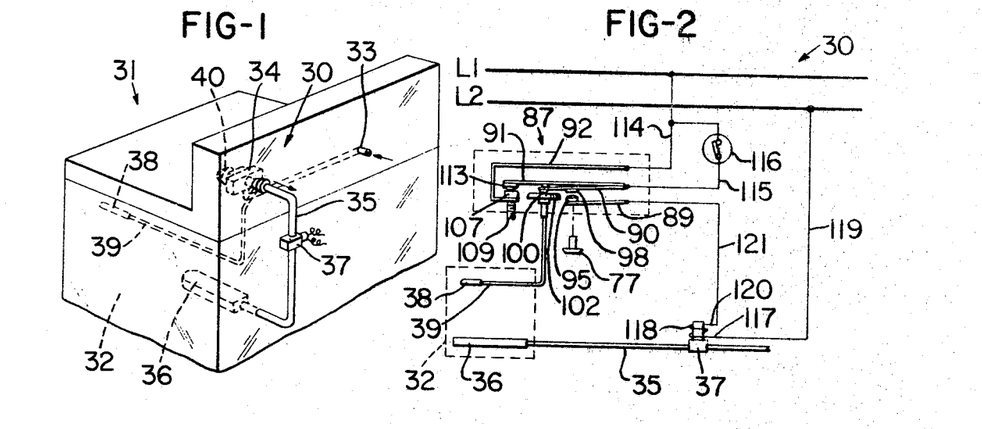
FIG. 1 is a fragmentary, perspective view of a typical apparatus utilizing the control system and parts of this invention.
FIG. 2 is a schematic view illustrating the control system of this invention in its "off" position.

Referring now to FIG. 1, the improved fuel control system of this invention is generally indicated by the reference numeral 30 and is being illustrated as providing a control system for a domestic range 31 having an oven chamber 32, the fuel control system 30 including a fuel supply manifold means 33 and a fuel control device 34 for interconnecting the fuel supply manifold 33 to a conduit means 35 leading to a burner means 36 for the oven 32. The conduit 35 has a solenoid operated valve means 37 or the like disposed therein to be controlled by an electric thermostat of the control device 34 in a manner hereinafter described, the electric thermostat of the control device 34 sensing the temperature effect in the oven 32 by means of a temperature sensing bulb 38 being interconnected to the control device 34 by a capillary tube 39 in a manner hereinafter described.

In this manner, the housewife or the like can set a selector means 40 of the control device 34 at a selected temperature setting whereby the control device 34 will maintain the temperature effect in the oven 32 at the selected temperature effect in a manner hereinafter described, the control system 30 also having means for automatically reducing the temperature effect in the oven 32 to a lower temperature effect after the occurrence of an event, such as after the lapse of a pre-selected cooking time period, whereby the lower temperature effect may be maintained in the oven 32 until the housewife or the like changes the control device 34, as will be apparent hereinafter.

Figure 7:
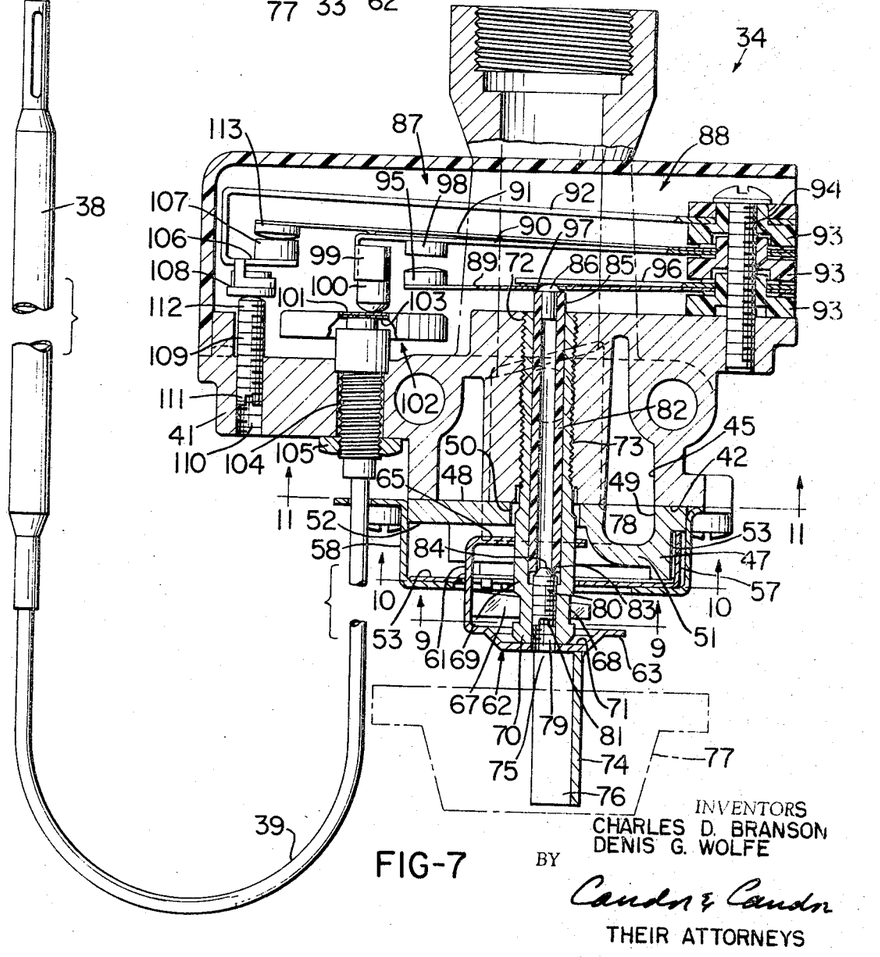
FIG. 7 is a cross-sectional view taken on line 7—7 of FIG. 6.
Figure 8:
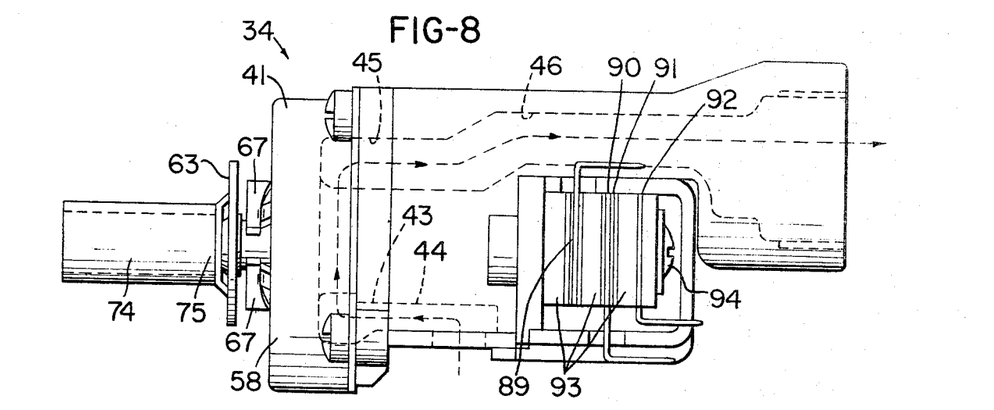
FIG. 8 is a side view of the control device of FIG. 6 and illustrates the fuel flow path therethrough.
Figure 9:
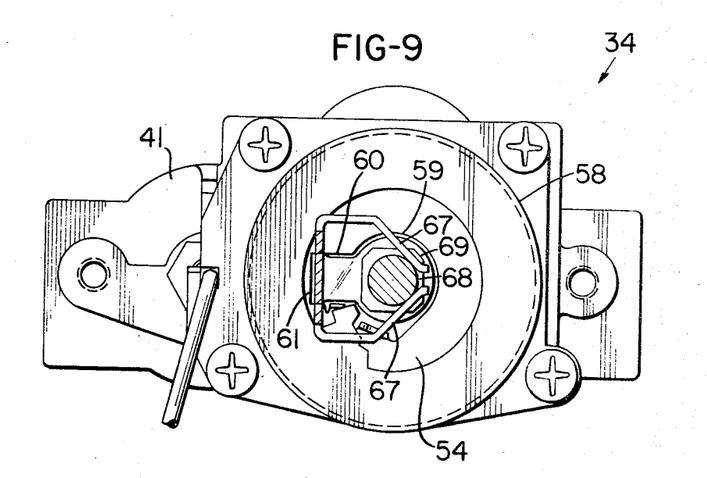
FIG. 9 is a cross-sectional view taken on line 9—9 of FIG. 7.

Referring now to FIG. 7, the control device 34 of this invention includes a housing means 41 having a flat valve surface 42 interrupted by an inlet port or opening 43 leading to an inlet passage means 44, FIG. 8, adapted to be fluidly interconnected to the gas supply manifold 33 in any suitable manner, such as by being directly attached thereto or being interconnected to such manifold 33 at a position remote therefrom by suitable conduit means. Similarly, the flat valve surface 42 is interrupted by an arcuate port or opening 45 leading to an outlet passage means 46, FIG. 8, in the housing means 41 to be interconnected to the conduit 35 that leads to the electrically operated valve means 37 of FIG. 1, and, thus, to the burner means 36 for the oven 32.

Figure 12:
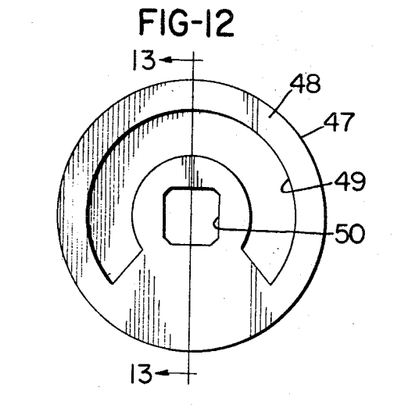
FIG. 12 is a rear plan view of the valve member of the control device of FIG. 6.
Figure 13:
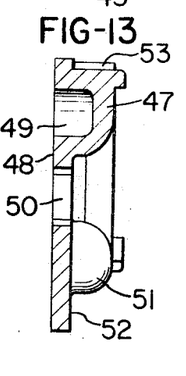
FIG. 13 is a cross-sectional view taken on line 13—13 of FIG. 12.
Figure 14:
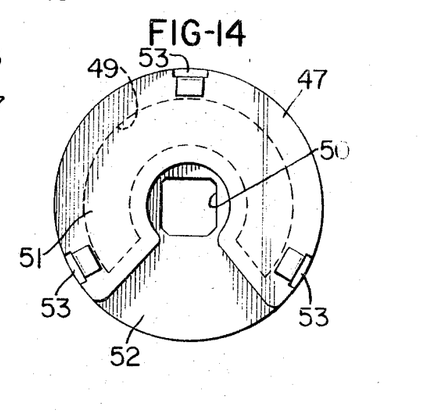
FIG. 14 is a front plan view of the valve member of FIG. 12.

A rotary disc valve member 47 is rotatably carried by the housing means 41 and is utilized for interconnecting and disconnecting the inlet port 43 of the valve surface 42 to and from the outlet port 45 thereof in a manner hereinafter described. As illustrated in FIGS. 12-14, the disc valve member 47 has a flat rear valve surface 48 interrupted by an arcuate recess 49 adapted to register with the port means 43 and 45 as hereinafter described, the valve member 47 having an opening 50 passing substantially therethrough and being of a substantially square cross-sectional configuration.

Figures 15, 16:
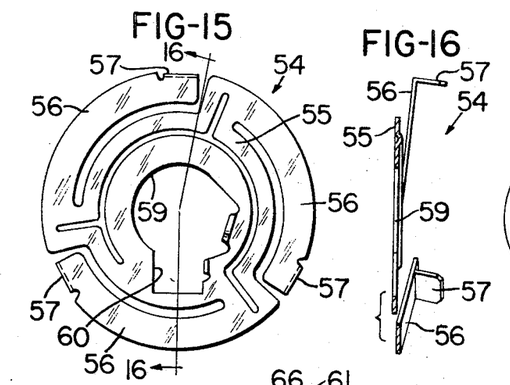
FIG. 15 is a front plan view of part of the selector means of the control device of FIG. 7.
FIG. 16 is a cross-sectional view taken on line 16—16 of FIG. 15.

The disc valve member 47 has an annular projection means 51 on the front side 52 thereof to coincide with the recess 49 and is provided with three peripheral recesses 53 to interconnect the same with a spring drive means 54, as illustrated in FIGS. 7, 15 and 16.

In particular, the spring drive means 54 has a substantially flat and circular part 55 suitably cut to define arcuate openings passing therethrough to add resiliency and define three legs 56 each having rearwardly extending tangs 57 adapted to be respectively received in the recesses 53 of the valve member 47 to not only drivingly interconnect the spring means 54 thereto so that the valve member 47 and spring means 54 will rotate in unison, but to also urge the valve surface 48 of the valve member 47 into sealing relationship with the valve surface 42 of the housing means 41 when the valve member 47 and spring means 54 are assembled to the housing 41 and held thereto by a cup-shaped retainer means 58 in the manner illustrated in FIG. 7.

Figure 10:
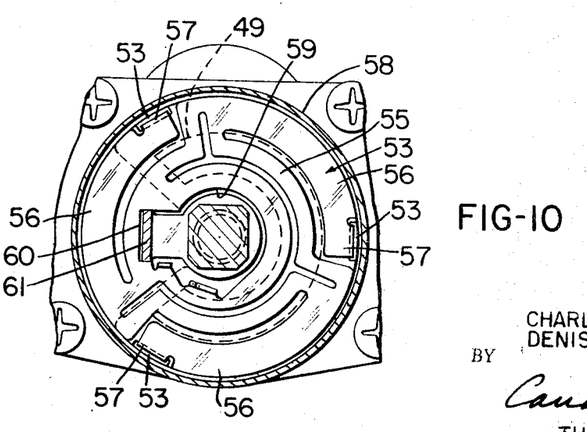
FIG. 10 is a fragmentary, cross-sectional view taken on line 10—10 of FIG. 7.
Figure 11:
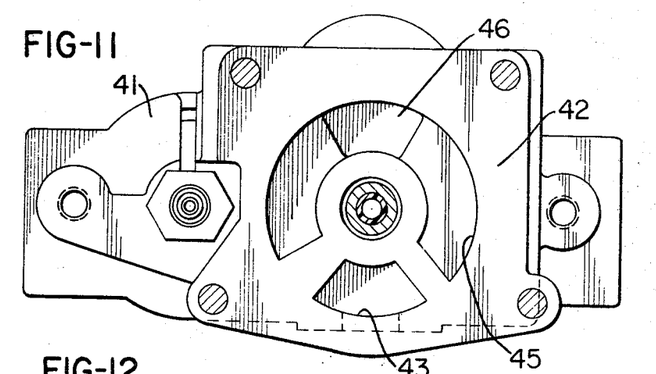
FIG. 11 is a cross-sectional view taken on line 11—11 of FIG. 7.

The central portion of the spring means 54 has an opening means 59 passing therethrough and defines a substantially rectangular portion 60 to drivingly receive an extension 61 of a selector part 62 in the manner illustrated in FIG. 10.

Figures 17, 18:
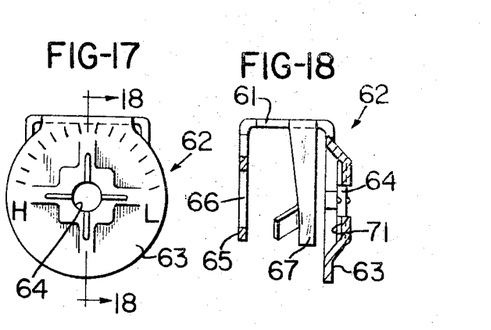
FIG. 17 is a front plan view of another part of the selector means of the control device of FIG. 7.
FIG. 18 is a cross-sectional view taken on line 18—18 of FIG. 17.
Figure 19:
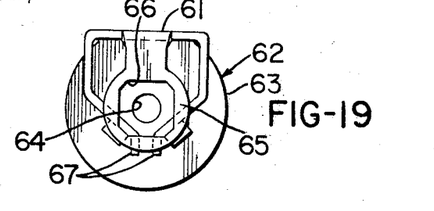
FIG. 19 is a rear plan view of the selector part of FIG. 17.

The selector part 62 is best illustrated in FIGS. 17-19 and includes a front disc-like member 63 having an opening 64 passing centrally therethrough and being integrally interconnected to the rearwardly extending flange 61 which terminates at a rear member 65 integrally interconnected to and having an opening 66 passing therethrough and coaxially aligned with the opening 64, as illustrated in FIG. 19. The flange 61 of the part 62 also has spring arms 67 extending traversely thereto to be urged by their natural resiliency into an annular recess 68, FIG. 7, of an adjusting member 69 having one end 70 fastened to the rear surface 71 of the front member 63 of the selector part 62 in coaxial alignment with the opening 64 to project through the opening 66 in the rear member 65 thereof, through the opening 59 of the spring member 54 and opening 50 of the valve member 47 and have its other end 72 threadedly received in a threaded bore 73 passing through the housing means 41.

The portion of the adjusting member 69 which is telescopically received in the opening 66 of the selector part 62 and the opening 50 of the valve member 47 has a cross-sectional configuration identical to the openings 66 and 50, whereby the parts 69, 47 and 62 will rotate in unison.

A C-shaped or other type of shaft member 74 has one end 75 secured to the front member 63 of the selector part 62 in the manner illustrated in FIG. 7 so that the other end 76 thereof can be secured to a selector knob 77. In this manner, rotation of the selector knob 77 relative to the housing means 41 of the control device 34 causes simultaneous rotation of the selector part 62 and 54 and simultaneous rotation of the adjusting member 69. However, rotation of the adjusting member 69 causes axial movement of the adjusting member 69 relative to the housing means 41 through the threaded relationship between the end 72 thereof and the threaded bore 73.

The adjusting member 69 has a bore means 78 passing axially therethrough, with one end 79 being internally threaded to receive an adjusting screw 80 having a bifurcated end 81 accessible through the opening 64 in the front member 63 of the selector part 62 for calibration purposes. A tubular insulating member 82 is disposed in the bore 78 of the adjusting member 69 and has one end 83 abutting against the end 84 of the adjusting screw 80 while the other end 85 projects beyond the end 72 of the adjusting member 69 and carries a rivet-like member 86 for controlling an electrical thermostat means 87 of this invention now to be described.

The electrical thermostat unit 87 is disposed in a chamber 88 of the housing means 41 and includes four spring blades 89, 90, 91 and 92, each having their right-hand ends in FIG. 7 cantilever mounted in stacked relation to the housing means 41 by suitable insulating block means 93 and fastening means 94. The spring blade 89 carries an electrical contact 95 on the free end thereof and has a natural tendency to move the contact 95 upwardly in FIG. 7.

However, a leaf spring 96 has it right-hand end in FIG. 7 cantilever mounted with the right-hand end of the spring blade 89 and has a natural bias to override the bias of the spring blade 89 and move the same downwardly in FIG. 7. The spring blade 89 has an opening 97 passing therethrough and telescopically receiving the rivet end 86 of the tubular member 85, whereby the position of the rivet end 86 limits the downward movement of the spring blade 89 under the influence of the overriding leaf spring 96, as the leaf spring 96 will abut the rivet end 86 of the tubular member 85 in the manner illustrated in FIG. 7 to compact the lower end 83 of the tubular member 82 against the end 84 of the adjusting screw 80.

The spring blade 90 carries an electrical contact 98 adjacent the free end 99 thereof and has a natural bias to tend to move the contact 98 downwardly in FIG. 7. However, the free end 99 of the spring blade 90 carries an abutment member 100 adapted to engage a movable wall 101 of an expansible and collapsible power element 102. The movement of the contact 98 relative to the contact 95 is controlled by the movable wall or part 101 of of the power element 102.

The power element 102 has another wall 103 cooperating with the wall 101 to define a fluid chamber therebetween which is disposed in fluid communication with the previously described capillary tube 39 of the temperature sensing bulb 38. The power element 102 is fixed to the housing means 41 by a threaded connector 104 and nut 105 in any suitable manner.

The spring blade 92 has a reversely curving free end 106 carrying an electrical contact 107 and has a natural bias to move the contact 107 downwardly in FIG. 7. However, the free end 106 of the spring blade 92 carries an abutment means 108 adapted to abut against an adjusting screw 109 threadedly disposed in an internally threaded bore 110 passing through the housing means 41. The threaded adjusting member 109 has a bifurcated end 111 to permit external adjustment of the screw 109 relative to the housing means 41 whereby the upper end 112 of the adjusting screw 109 can be positioned in a desired position and, thus, position the contact 107 in a desired position relative to the housing means 41 for a low temperature operation in a manner hereinafter described.

The spring blade 91 carries a contact 113 on the free end thereof and has a natural bias to tend to move the contact 113 downwardly to cooperate with the contact 107 in a manner hereinafter described. However, the spring blade 91 bears against the spring blade 90 whereby the position of the contact 113 relative to the contact 107 is also controlled by the movable part 101 of the power element 102.

The control device 34 of this invention can be utilized in the system 30 previously described and reference is now made to FIGS. 2–5 to illustrate the electrical circuit for the system 30.

In particular, it can be seen in FIG. 2 that a power source lead L1 is adapted to be electrically interconnected to the right-hand end of the switchblade 92 by a lead 114 whereby the fixed contact 107 is electrically interconnected to the lead L1. A branch lead 115 interconnects the lead 114 to the right-hand end of the switchblades 90 and 91 to electrically interconnect the respective contacts 98 and 113 to the power source lead L1. However, the lead 115 has a clock timer operated electrical switch means 116 therein which only permits the lead L1 to be interconnected to the switchblades 90 and 91 when the timer operated switch means 116 is disposed in its normally closed position, as illustrated in FIG. 2.

The power source lead L2 is interconnected to one side 117 of a solenoid coil 118 of the valve means 37 in the conduit 35 by a lead 119. The other side 120 of the solenoid coil 118 is interconnected to the right-hand end of the switchblade 89 by a lead 121 whereby the contact 95 is electrically interconnected to the power source lead L2.

The operation of the control system 30 and the control device 34 will now be described.

Figures 20, 21, 22:
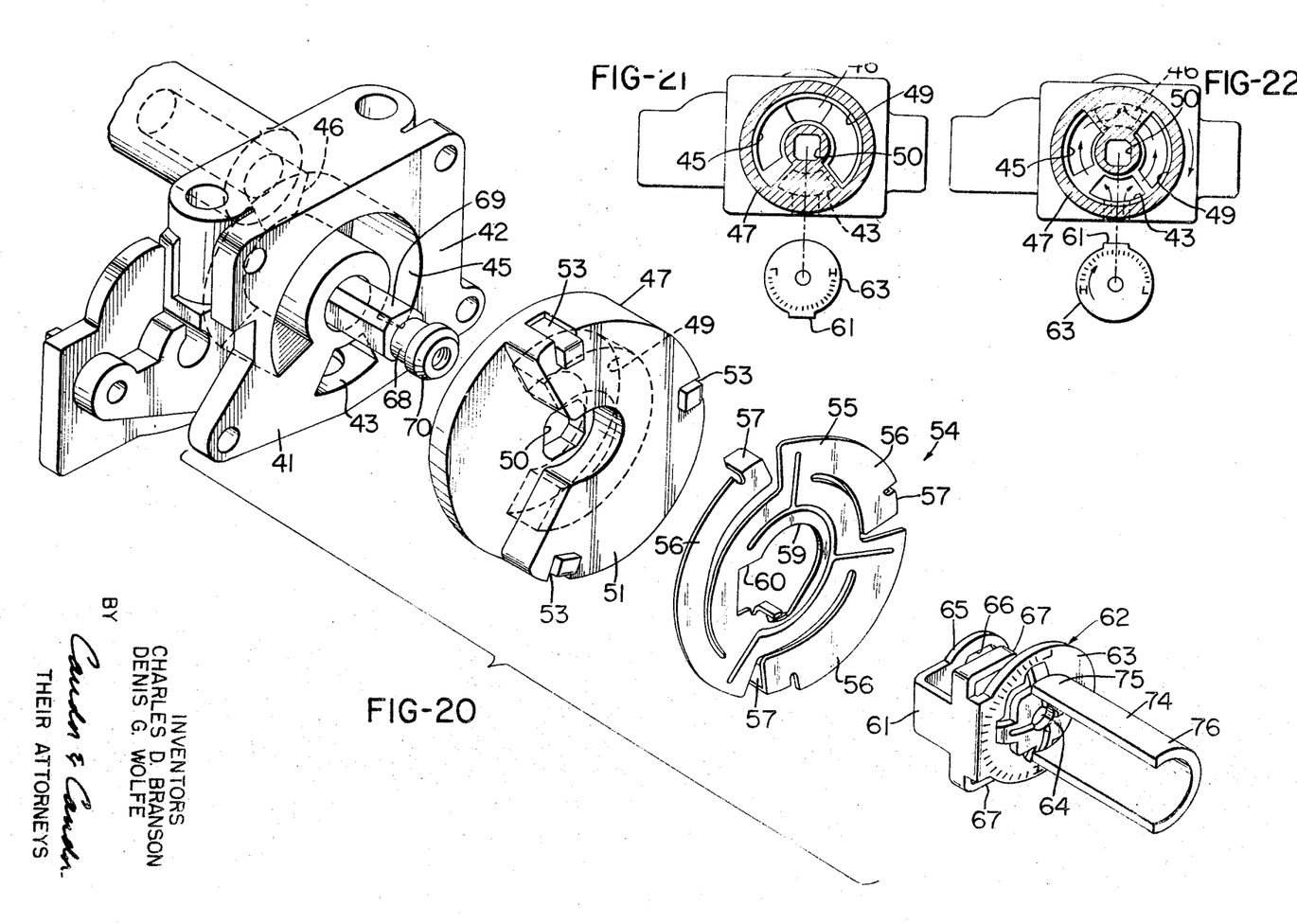
FIG. 20 is an exploded, perspective view of certain parts of the control device of FIG. 7.
FIG. 21 is a schematic view of the control device of FIG. 7, partially in cross section, illustrating the control device in its "off" position.
FIG. 22 is a view similar to FIG. 21 and illustrates the control device in its "on" position.

As previously stated, the timer operated switch 116 is normally closed and when the selector knob 77 is disposed in its "off" position, as illustrated in FIGS. 2, 7 and 21, not only is the recess 49 of the valve member 47 disposed out of fluid communication with the inlet port 43 to prevent fuel from flowing from the manifold 33 to the conduit 45, but also the adjusting member 69 is in its outermost axial position relative to the housing means 41 to position the contact 95 fully away from the contact 98, so that the contacts 98 and 95 cannot be placed in electrical contact with each other, regardless of the position of the movable wall part 101 of the power element 102. In this manner, the solenoid coil 118 cannot be placed across the power source leads L1 and L2, as the contacts 95 and 98 will always be in a separated condition when the control device 34 is in its "off" position.

In the "off" position of the control device, the contacts 107 and 113 are together, as illustrated in FIGS. 2 and 7. However, the valve 37 is not energized, as the contacts 98 and 95 are separated in this "off" position of the control device 34.

When the housewife or the like desires to operate the oven 32 with a cooking temperature, the housewife or the like rotates the selector knob 77 in a clockwise direction from the position illustrated in FIG. 21 toward the maximum temperature setting position illustrated in FIG. 22 until the selector knob 77 is set at the desired cooking temperature, such as 325° F. or the like. With the control knob 77 rotated to any temperature setting thereof, it can be seen that the recess 49 of the valve member 47 will fluidly interconnect the inlet port 43 with the outlet port 45 to permit fuel to flow from the manifold 33 through the housing means 41 and the conduit 35 to the solenoid operated valve member 37. In addition, clockwise rotation of the selector knob 77 from its "off" position to the desired temperature-setting position previously described causes axial inward movement of the adjusting member 69 to move the leaf spring 96 upwardly to a desired position whereby the bias of the spring blade 89 follows the upward movement of the leaf spring 96 to position the contact 95 at a temperature setting position selected by the knob 77.

Since the oven 32 is at a temperature below the selected temperature, such positioning of the adjusting member 69 by the selector knob 77 places the contact 95 against the contact 98 and moves the spring blades 90 and 91 upwardly therewith.

Figure 3:
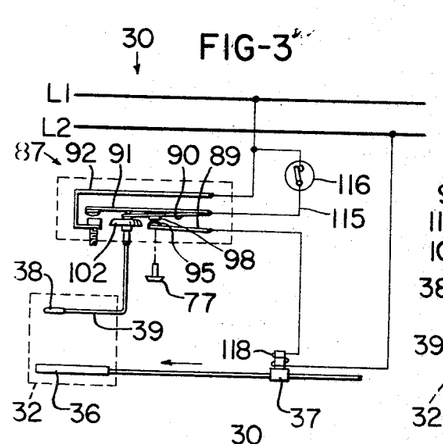
FIG. 3 is a view similar to FIG. 2 and illustrates the system in its "on" position.

Thus, it can be seen that in this position of the control device 34, the coil 118 of the solenoid operated valve member 37 is placed across the power leads L1 and L2 in the manner illustrated in FIG. 3, because the switch 116 is closed and the contacts 95 and 98 are in electrical contact with each other. Thus, the valve member 37 opens to permit fuel to flow from the control device 34 to the burner means 36 to be ignited by suitable igniting means.

The system 30 remains in the condition illustrated in FIG. 3 as long as the temperature effect produced by the burner means 36 is below the temperature setting of the selector knob 77. However, once the temperature in the oven 32 reaches or rises slightly above the selected temperature effect of the control knob 77, the temperature sensing bulb 38 has caused the power element 102 to expand in such a manner that the movable wall part 101 has moved upwardly in FIG. 7 a distance sufficient to carry the spring blades 90 and 91 therewith and separate the contact 98 from the contact 95 to terminate the flow of current through the coil 118 so that the valve means 37 will close and terminate the flow of fuel through the burner means 36.

When the temperature effect in the oven 32 falls below the selected temperature effect of the knob 77, the temperature sensing bulb 38 has caused the movable wall part 101 of the power element 102 in FIG. 7 to move downwardly a distance sufficient to again place the contact 98 into electrical contact with the contact 95 and again energize the coil 118 to open the valve means 37 and permit fuel to flow to the burner means 36.

Thus, it can be seen that the thermostat means 87 of this invention is adapted to cycle on and off the burner means 36 of the oven 32 to tend to maintain the temperature effect in the oven 32 at the temperature selected by the selector knob 77.

If the housewife or the like had set the timer-operated switch means 116 to open the switch 116 after the lapse of a pre-determined cooking time, such as two hours or the like, the thermostat means 87 of the control system 30 would maintain the temperature effect in the oven 32 at the previously described 325° F., as set by the selector knob 77 for this two-hour period in the manner previously described. However, when the two-hour cooking period lapsed, the timer-operated switch 116 will automatically open in the manner illustrated in FIG. 4 to prevent the solenoid-operated valve 37 from having its coil 118 energized through the closing of the contacts 98 and 95. Thus, the temperature effect in the oven 32 decreases, causing the movable wall part 101 of the power element 102 to move downwardly and the switchblades 90 and 91 follow therewith and carry the switchblade 89 therewith as the bias of the switchblades 90 and 91 is stronger than the upward bias of the switchblade 89, such downward movement of the switchblade 89 relative to the adjusting member 69 is permitted by the opening 97 in the blade 89.

Figure 4:
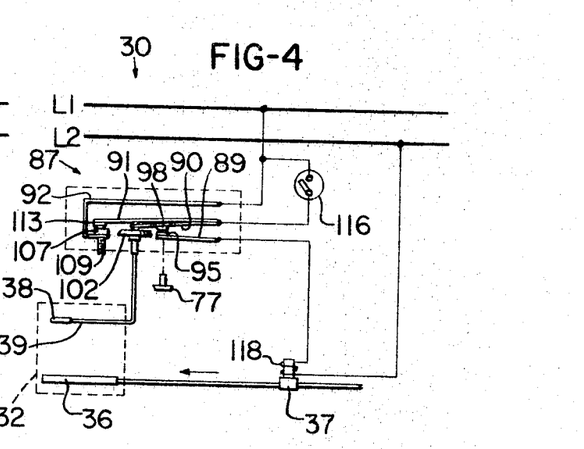
FIG. 4 is a view similar to FIG. 2 and illustrates the system in its "keep warm" position.

Such downward movement of the switchblades 90 and 91 continues until the switchblade 91 places the contact 113 into electrical contact with the contact 107 in the manner illustrated in FIG. 4, whereby it can be seen that the solenoid coil 118 is now placed across the power source leads L1 and L2 by the closed contacts 113 and 107, even though the timer-operated switch means 116 is in its open condition because the contacts 98 and 95 of the device 34 are always in contact with each other when the device 34 is in its "keep warm" setting.

Thus, fuel is again supplied to the burner means 36 by the now energized valve means 37 to tend to maintain the temperature effect in the oven 32 at a warmth-retaining and non-cooking temperature as previously set by the adjusting screw 109. In particular, the temperature sensing bulb 38 will cause the power element 102 to separate the contacts 113 and 107 when the temperature effect in the oven 32 rises above the "keep warm" temperature setting of the screw 109 and will place the contacts 113 and 107 in electrical contact when the temperature effect in the oven 32 falls below the "keep warm" temperature.

Thus, the control system 30 of this invention, through the control device 34, will maintain the temperature effect of the oven 32 at its "keep warm" temperature until the housewife or the like turns the selector knob 77 to its "off" position, as illustrated in FIG. 2.

Figure 5:
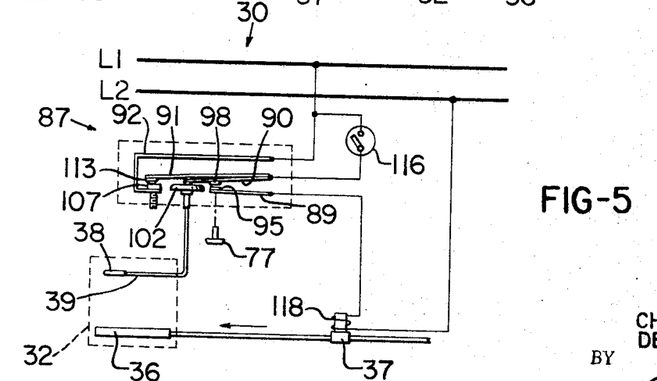
FIG. 5 is a view similar to FIG. 4 and illustrates the system being utilized at a temperature setting below the "keep warm" setting of FIG. 4.
Figure 6:
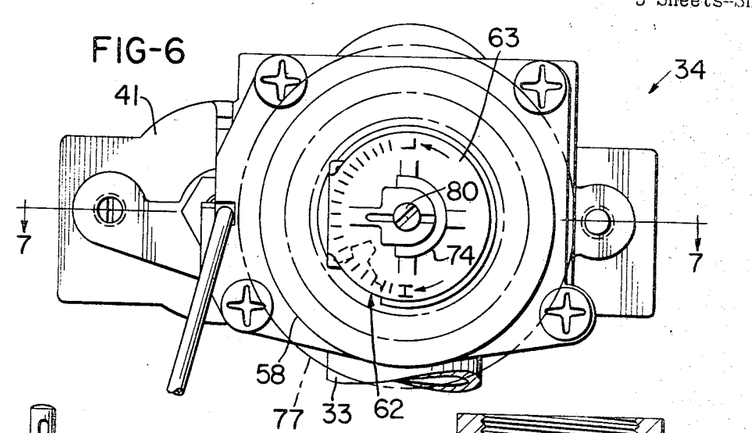
FIG. 6 is a front view of the control device of this invention with the selector knob removed.

However, should the control system 30 be in the "keep warm" condition illustrated in FIG. 4 wherein the timer-operated switch 116 is in its "open" position and the housewife or the like desires to have the temperature effect in the oven 32 be maintained by the control device 34 at a temperature below the automatic "keep-warm" temperature, as set by the adjusting screw 109, the housewife can turn the selector knob 77 to such lower temperature to reposition the contact 95 downwardly from the position illustrated in FIG. 4 to the position illustrated in FIG. 5, whereby even though the power element 102 maintains the contacts 113 and 107 in electrical contact with each other, the temperature in the oven 32 will have to decrease to the lower temperature selected by the knob 77 in order to place the contact 98 into electrical contact with the contact 95 and complete the circuit across the coil 118 of the valve means 37.

Thus, the temperature sensing bulb 39 will cause the power element 102 to open and close the contacts 98 and 95 to tend to maintain the temperature effect in the oven 32 at the low temperature setting set by the control knob 77, even though the switch means 116 is in its "open" position.

Accordingly, it can be seen that not only does this invention provide an improved control system for an apparatus or the like wherein a control device combines a valve member for controlling fuel flow with an electrical thermostat for maintaining a desired temperature effect of a burner means, but also this invention provides improved parts for such a control system or the like.

What is claimed is:

1. In combination, a source of fuel, a burner means, passage defining means interconnecting said source of fuel to said burner means, a selector valve means in said passage defining means between said source of fuel and said burner means for opening and closing said passage defining means, a single manually operated selector means for moving said selector valve means to open and close said passage defining means, electrically operated valve means in said passage defining means between said selector valve means and said burner means, and an electric thermostat for operating said electrically operated valve means in response to the temperature effect of said burner means to tend to maintain said temperature effect at a temperature setting of said thermostat, said annually operated selector means being operatively interconnected to said thermostat for selecting said temperature setting of said thermostat, said manually operated selector means being movable through a range of temperature settings for said thermostat and moving said selector valve means throughout the entire range of movement of said manually operated selector means.

2. A combination as set forth in claim 1 wherein said thermostat includes means for changing said temperature effect to a predetermined temperature effect after the occurrence of an event.

3. A combination as set forth in claim 2 wherein said last-named means changes said temperature effect to said predetermined temperature effect without changing the position of said manually operated selector means.

4. A combination as set forth in claim 1 wherein said thermostat includes a temperature sensing means having a part movable in response to changes in said temperature effect of said burner means.

5. A combination as set forth in claim 4 wherein said thermostat includes an electrical switch having a first electrical contact and a second electrical contact, said first contact being positioned relative to said second contact in response to movement of said movable part of said temperature sensing means, said second contact being normally positioned relative to said first contact by movement of said selector means to a desired temperature setting thereof whereby said contacts are placed into contact with each other by said movable part when said temperature sensing means senses a temperature effect below said selected temperature setting and moves said first contact out of contact with said second contact when said temperature sensing means senses a temperature effect above said selected temperature setting.

6. A combination as set forth in claim 5 wherein a pair of spring blades respectively carry said first and second contacts.

7. In combination, a source of fuel, a burner means, passage defining means interconnecting said source of fuel to said burner means, a selector valve means in said passage defining means between said source of fuel and said burner means for opening and closing said passage defining means, manually operated selector means for moving said selector valve means to open and close said passage defining means, electrically operated valve means in said passage defining means between said selector valve means and said burner means, and an electric thermostat for operating said electrically operated valve means in response to the temperature effect of said burner means to tend to maintain said temperature effect at a temperature setting of said thermostat, said manually operated selector means selecting said temperature setting of said thermostat, said thermostat comprising a temperature sensing means having a part movable in response to changes in said temperature effect of said burner means, said thermostat comprising an electrical switch having a first electrical contact and a second electrical contact, said first contact being positioned relative to said second contact in response to movement of said movable part of said temperature sensing means, said second contact being normally positioned relative to said first contact by movement of said selector means to a desired temperautre setting thereof whereby said contacts are placed into contact with each other by said movable part when said temperature sensing means senses a temperature effect below said selected temperature setting and moves said first contact out of contact with said second contact when said temperature sensing means senses a temperature effect above said selected temperature setting, said thermostat comprising another electrical switch having a fixed contact and a movable contact, said movable contact being positioned relative to said fixed contact by said movable part of said temperature sensing means.

8. A combination as set forth in claim 7 and including means for adjusting the position of said fixed contact relative to said movable contact.

9. A combination as set forth in claim 1 wherein said selector valve means is rotatably mounted for opening and closing said passage defining means, and an axially movable and rotatable adjusting member for setting said thermostat, said manual selector means simultaneously rotating said adjusting member and said selector valve means when said manual selector means is rotated.

10. In combination, a source of fuel, a burner means, passage defining means interconnecting said source of fuel to said burner means, a selector valve means in said passage defining means between said source of fuel and said burner means for opening and closing said passage defining means, manually operated selector means for moving said selector valve means to open and close said passage defining means, electrically operated valve means in said passage defining means between said selector valve means and said burner means, an electric thermostat for operating said electrically operated valve means in response to the temperature effect of said burner means to tend to maintain said temperature effect at a temperature setting of said thermostat, said manually operated selector means selecting said temperature setting of said thermostat, said selector valve means being rotatably mounted for opening and closing said passage defining means, and an axially movable and rotatable adjusting member for setting said thermostat, said manual selector means simultaneously rotating said adjusting member and said selector valve means when said manual selector means is rotated, said selector valve means comprising a disc valve member having an opening passing therethrough, said adjusting member projecting through said opening.

11. A control device for directing a source of fuel to a burner means or the like comprising a housing having an inlet adapted to be interconnected to said source of fuel and an outlet adapted to be interconnected to said burner means, a selector valve means carried by said housing for interconnecting said inlet to said outlet and for disconnecting said inlet from said outlet, a single manually operated selector means carried by said housing for moving said selector valve means to interconnect said inlet to said outlet and to disconnect said inlet from said outlet, and an electric thermostat carried by said housing and being adapted to control an electrically operated valve means disposed between said outlet and said burner means, said thermostat being adapted to open and close said electrically operated valve means in response to a temperature effect of said burner means to tend to maintain said temperature effect at a temperature setting of said thermostat, said manually operated selector means being operatively interconnected to said thermostat so as to be adapted to select said temperature setting of said thermostat, said manually operated selector means being movable through a range of temperature settings for said thermostat and moving said selector valve means throughout the entire range of movement of said manually operated selector means.

12. A control device as set forth in claim 11 wherein said thermostat includes means adapted to change said temperature effect to a predetermined temperautre effect after the occurrence of an event.

13. A control device as set forth in claim 12 wherein said last-named means is adapted to change said temperature effect to said predetermined temperature effect without changing the position of said manually operated selector means.

14. A control device as set forth in claim 11 wherein said thermostat includes a temperature sensing means having a part adapted to be movable in response to changes in said temperature effect of said burner means.

15. A control device as set forth in claim 14 wherein said thermostat includes an electrical switch carried by said housing means and having a first electrical contact and a second electrical contact, said first contact being positioned relative to said second contact in response to movement of said movable part of said temperature sensing means, said second contact being normally positioned relative to said first contact by movement of said selector means to a desired temperature setting thereof whereby said contacts are adapted to be placed into contact with each other by said movable part when said temperature sensing means senses a temperature effect below said selected temperature setting and said first contact is adapted to be moved out of contact with said second contact by said movable part when said temperature sensing means senses a temperature effect above said selected temperature setting.

16. A control device as set forth in claim 15 wherein a pair of spring blades respectively carry said first and second contacts.

17. A control device for directing a source of fuel to a burner means or the like comprising a housing having an inlet adapted to be interconnected to said source of fuel and an outlet adapted to be interconnected to said burner means, a selector valve means carried by said housing for interconnecting said inlet to said outlet and for disconnecting said inlet from said outlet, manually operated selector means carried by said housing for moving said selector valve means to interconnect said inlet to said outlet and to disconnect said inlet from said outlet, and an electric thermostat carried by said housing and being adapted to control an electrically operated valve means disposed between said outlet and said burner means, said thermostat being adapted to open and close said electrically operated valve means in response to a temperature effect of said burnner means to tend to maintain said temperature effect at a temperature setting of said thermostat, said manually operated selector means being adapted to select said temperature setting of said thermostat, said thermostat comprising a temperature sensing means having a part adapted to be movable in response to changes in said temperature effect of said burner means, said thermostat comprising an electrical switch carried by said housing means and having a first electrical contact and a second electrical contact, said first contact being positioned relative to said second contact in response to movement of said movable part of said temperature sensing means, said second contact being normally positioned relative to said first contact by movement of said selector means to a desired temperature setting thereof whereby said contacts are adapted to be placed into contact with each other by said movable part when said temperature sensing means senses a temperature effect below said selected temperature setting and said first contact is adapted to be moved out of contact with said second contact by said movable part when said temperature sensing means senses a temperature effect above said selected temperature setting, said thermostat comprising another electrical switch carried by said housing and having a fixed contact and a movable contact, said movable contact being positioned relative to said fixed contact by said movable part of said temperature sensing means.

18. A control device as set forth in claim 17 and including means for adjusting the position of said fixed contact relative to said movable contact.

19. A control device as set forth in claim 11 wherein said selector valve means is rotatably mounted to said housing for interconnecting said inlet to said outlet and for disconnecting said inlet from said outlet, and an axially movable and rotatable adjusting member carried by said housing for setting said thermostat, said manual selector means simultaneously rotating said adjusting member and said selector valve means when said manual selector means is rotated relative to said housing.

20. A control device for directing a source of fuel to a burner means or the like comprising a housing having an inlet adapted to be interconnected to said source of fuel and an outlet adapted to be interconnected to said burner means, a selector valve means carried by said housing for interconnecting said inlet to said outlet and for disconnecting said inlet from said outlet, manually operated selector means carried by said housing for moving said selector valve means to interconnect said inlet to said outlet and to disconnect said inlet from said outlet, an electric thermostat carried by said housing and being adapted to control an electrically operated valve means disposed between said outlet and said burner means, said thermostat being adapted to open and close said electrically operated valve means in response to a temperature effect of said burner means to tend to maintain said temperature effect at a temperature setting of said thermostat, said manually operated selector means being adapted to select said temperature setting of said thermostat, said selector valve means being rotatably mounted to said housing for interconnecting said inlet to said outlet and for disconnecting said inlet from said outlet, and an axially movable and rotatable adjusting member carried by said housing for setting said thermostat, said manual selector means simultaneously rotating said adjusting member and said selector valve means when said manual selector means is rotated relative to said housing, said selector valve means comprising a disc valve member having an opening passing therethrough, said adjusting member projecting through said opening.

References Cited

UNITED STATES PATENTS

| | | | |
|---|---|---|---|
| 2,099,171 | 11/1937 | Matthews et al. | 236—15 |
| 2,606,991 | 8/1952 | Candor | 236—46 |
| 2,885,151 | 5/1959 | Weber | 236—75 X |
| 3,123,298 | 3/1964 | Wolffe | 236—46 |
| 3,191,861 | 6/1965 | Dahlgren | 236—15 |
| 3,393,869 | 7/1968 | Grayson | 236—46 X |
| 3,411,713 | 11/1968 | Wallace et al. | 236—99 |

WILLIAM E. WAYNER, Primary Examiner

U.S. Cl. X.R.

236—75